US009880656B2

(12) United States Patent
Nishibori

(10) Patent No.: US 9,880,656 B2
(45) Date of Patent: Jan. 30, 2018

(54) INFORMATION TERMINAL, DISPLAY CONTROLLING METHOD AND PROGRAM

(71) Applicant: NEC Corporation, Minato-ku, Tokyo (JP)

(72) Inventor: Takahisa Nishibori, Kawasaki (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/780,234

(22) PCT Filed: Mar. 26, 2014

(86) PCT No.: PCT/JP2014/058575
§ 371 (c)(1),
(2) Date: Sep. 25, 2015

(87) PCT Pub. No.: WO2014/157357
PCT Pub. Date: Oct. 2, 2014

(65) Prior Publication Data
US 2016/0041682 A1 Feb. 11, 2016

(30) Foreign Application Priority Data
Mar. 27, 2013 (JP) ................................ 2013-066404

(51) Int. Cl.
G06F 3/041 (2006.01)
G06F 3/0488 (2013.01)
(Continued)

(52) U.S. Cl.
CPC .......... G06F 3/0416 (2013.01); G06F 1/1618 (2013.01); G06F 1/1692 (2013.01);
(Continued)

(58) Field of Classification Search
CPC .... G06F 1/1618; G06F 1/1692; G06F 1/1694; G06F 3/0416; G06F 3/04845;
(Continued)

(56) References Cited

U.S. PATENT DOCUMENTS 5,467,102 A   11/1995  Kuno et al.
8,554,287 B1 * 10/2013  Rao .......................... G06F 21/32
                                                      361/679.55
(Continued)

FOREIGN PATENT DOCUMENTS

CN      1551596 A    12/2004
CN    101052179 A    10/2007
(Continued)

OTHER PUBLICATIONS

International Search Report for PCT Application No. PCT/JP2014/058575, dated Jun. 17, 2014.
(Continued)

Primary Examiner — Joe H Cheng

(57) ABSTRACT

An information terminal includes a first housing and a second housing interconnected for opening/ closure, a first display unit and a first touch panel stacked one upon the other on the first housing, and a second display unit and a second touch panel stacked one upon the other on the second housing. The information terminal also includes a detection unit which, in a closed state with the first and second display units superposed one upon the other and facing outwards, detects actuations on one of the first touch panel and the second touch panel that happens to be back-facing as seen from a user. The information terminal further includes a controller that controls an onscreen display on the first display unit or the second display unit that happens to be front-facing as seen from the user, based on information regarding the actuations detected by the detection unit.

9 Claims, 15 Drawing Sheets

(51) Int. Cl.
*G06F 3/0487* (2013.01)
*G06F 3/0485* (2013.01)
*G06F 1/16* (2006.01)

(52) U.S. Cl.
CPC .......... *G06F 3/0485* (2013.01); *G06F 3/0487* (2013.01); *G06F 3/0488* (2013.01)

(58) Field of Classification Search
CPC ............... G06F 3/04847; G06F 3/0488; G06F 2203/04808; H04M 2250/16; H04M 2250/22
See application file for complete search history.

(56) References Cited

U.S. PATENT DOCUMENTS

| | | | |
|---|---|---|---|
| 9,086,787 B2 * | 7/2015 | Park | G06F 3/0488 |
| 2004/0214612 A1 | 10/2004 | Park et al. | |
| 2007/0232336 A1 | 10/2007 | Kim et al. | |
| 2010/0056220 A1 * | 3/2010 | Oh | G06F 1/1616 |
| | | | 455/566 |
| 2010/0289760 A1 | 11/2010 | Jonoshita et al. | |
| 2010/0302179 A1 | 12/2010 | Ahn et al. | |
| 2011/0012921 A1 | 1/2011 | Cholewin et al. | |
| 2011/0074716 A1 * | 3/2011 | Ono | G06F 1/1626 |
| | | | 345/173 |
| 2011/0163986 A1 * | 7/2011 | Lee | G06F 1/1692 |
| | | | 345/173 |
| 2012/0081317 A1 * | 4/2012 | Sirpal | G06F 1/1616 |
| | | | 345/173 |
| 2012/0081323 A1 * | 4/2012 | Sirpal | G06F 1/1616 |
| | | | 345/173 |
| 2012/0218191 A1 * | 8/2012 | Huang | G06F 1/1643 |
| | | | 345/173 |
| 2014/0035794 A1 * | 2/2014 | Chen | G06F 3/1431 |
| | | | 345/1.3 |
| 2014/0045553 A1 * | 2/2014 | Shimada | G06F 3/041 |
| | | | 455/566 |
| 2014/0101578 A1 * | 4/2014 | Kwak | G06F 3/017 |
| | | | 715/761 |
| 2014/0101579 A1 * | 4/2014 | Kim | G06F 3/0486 |
| | | | 715/761 |
| 2015/0234629 A1 * | 8/2015 | Park | G06F 3/1423 |
| | | | 455/566 |

FOREIGN PATENT DOCUMENTS

| | | |
|---|---|---|
| EP | 1843563 A1 | 10/2007 |
| JP | 2008532185 A | 8/2008 |
| JP | 2008-209679 A | 9/2008 |
| JP | 2009-223426 A | 10/2009 |
| JP | 2011-028673 A | 2/2011 |
| JP | 2011-209899 A | 10/2011 |
| JP | 2011237945 A | 11/2011 |
| JP | 2013-008340 A | 1/2013 |
| JP | 2013-54467 A | 3/2013 |
| KR | 2002-0078373 A | 10/2002 |
| WO | 2011/142151 A1 | 11/2011 |
| WO | 2013/003984 A1 | 1/2013 |

OTHER PUBLICATIONS

Extended European Search Report for EP Application No. EP14774551.7 dated Nov. 8, 2016.
Chinese Office Action for CN Application No. 201480018512.9 dated Sep. 20, 2017 with English Translation.
Office action in counterpart JP patent application 2015-508598, by Japanese Patent Office, dated Dec. 12, 2017 (translation provided at end of file).

* cited by examiner

INFORMATION TERMINAL, DISPLAY CONTROLLING METHOD AND PROGRAM

This application is a National Stage Entry of PCT/JP2014/058575 filed on Mar. 26, 2014, which claims priority from Japanese Patent Application 2013-066404 filed on Mar. 27, 2013, the contents of all of which are incorporated herein by reference, in their entirety.

CROSS-REFERENCE TO RELATED APPLICATION

The present application asserts priority rights based on JP Patent Application No.2013-066404 filed in Japan on Mar. 27, 2013, total contents of which are to be incorporated by reference into the present application.

TECHNICAL FIELD

This invention relates to display control which relies upon actuations on a touch panel.

BACKGROUND

In information terminals that recently have become widespread, including smartphones, such actuation functions as scrolling on a screen surface as well as pinch out/pinch in (enlarging/shrinkage) by a touch panel, are offered to a user.

In Patent Literature 1, there is disclosed an information terminal provided not only with a touch panel on a display screen but also with a touch panel on a back surface. In the information terminal, it is possible to actuate the touch panel on the back side with a finger(s) other than a thumb finger to carry out processing commands correlated with the user's fingers except the thumb finger (see FIG. 10 and FIG. 11 of Patent Literature 1).

Patent Literature 1: WO2011/142151A

SUMMARY

The following analysis is given by the present invention.

In general, in an information terminal, such as smartphone, a scroll operation may be made as a user sets his/her sole finger on a touch panel and moves it in a sliding fashion on the screen surface in an up-and-down direction. However, there is a problem that the finger set on the display screen surface hides a portion of the display screen surface from view. There is also a problem that, in scrolling on a Web page in an up-and-down direction, the scrolling operation by the user may be taken to be a click actuation such that display may jump to a link destination. Moreover, in doing a pinch out/pinch in (enlarge/shrink) operation, the user has to grip the information terminal with his/her hand and set two fingers of his/her other hand on the touch panel to perform spreading/pinching on the screen surface. That is, the user has to use both hands. There is thus a demand for an information terminal with which it is possible to overcome the above mentioned inconveniences.

In addition, the information terminal of Patent Literature 1 suffers from another problem that actuation on the back-facing touch panel with a finger(s) other than the thumb finger to select processing commands, as well as the finger operation for carrying out each of a variety of the processing commands, is not intuitive, while being difficult to understand.

It is therefore an object of the present invention to provide an information terminal that contributes to improving ease in the touch panel actuations.

In a first aspect of the present invention, there is provided an information terminal including a first housing and a second housing interconnected for opening/closure, a first display unit as well as a first touch panel stacked one upon the other on the first housing, and a second display unit as well as a second touch panel stacked one upon the other on the second housing. The information terminal also includes a detection unit which, in a closed state with the first and second display units superposed one upon the other and facing outwards, detects actuations on one of the first touch panel and the second touch panel that happens to be back-facing as seen from a user. The information terminal further includes a controller that controls onscreen display on one of the first display unit and the second display unit that happens to be front-facing, as seen from the user, based on information regarding the actuations detected by the detection unit.

In a second aspect of the present invention, there is provided a method for controlling a display on a first screen and a display on a second screen which may be superposed on the first screen, wherein the method includes detecting actuations on a touch panel mounted on one of the first screen and the second screen that happens to be back-facing when seen from a viewer, and controlling the onscreen display on one of the first screen and the second screen that happens to be front-facing as seen from the viewer, based on information regarding the actuations as detected in the detection process.

In a third aspect of the present invention, there is provided a program for performing display control on a first screen and a second screen which may be superposed on the first screen, wherein the program causes a computer to perform a processing of detecting actuations on a touch panel arranged on one of the first screen and the second screen that happens to be back-facing as seen from a user, and a processing of controlling the onscreen display on one of the first screen and the second screen that happens to be front-facing, based on information regarding actuations as detected by the user. By the way, the program can be recorded on a computer-readable recording medium which may be a non-transient recording medium, such as a semiconductor memory, a hard disc, a magnetic recording medium or an optical recording medium. The present invention may also be implemented as a computer program product.

According to the present invention, there may be provided an information terminal capable of contributing to improving the ease in actuations on a touch panel.

BRIEF DESCRIPTION OF THE DRAWINGS

FIG. 11 (A) and FIG. 11(B) are schematic views for illustrating the modification 3 of the exemplary embodiment 1.

PREFERRED MODES

Initially, a summary of an exemplary embodiment of the present invention will be described with reference to the drawings. It is noted that symbols for referencing the drawings are entered in the summary merely as examples to assist in understanding and are not intended to limit the present invention to the mode illustrated.

Figure 1:
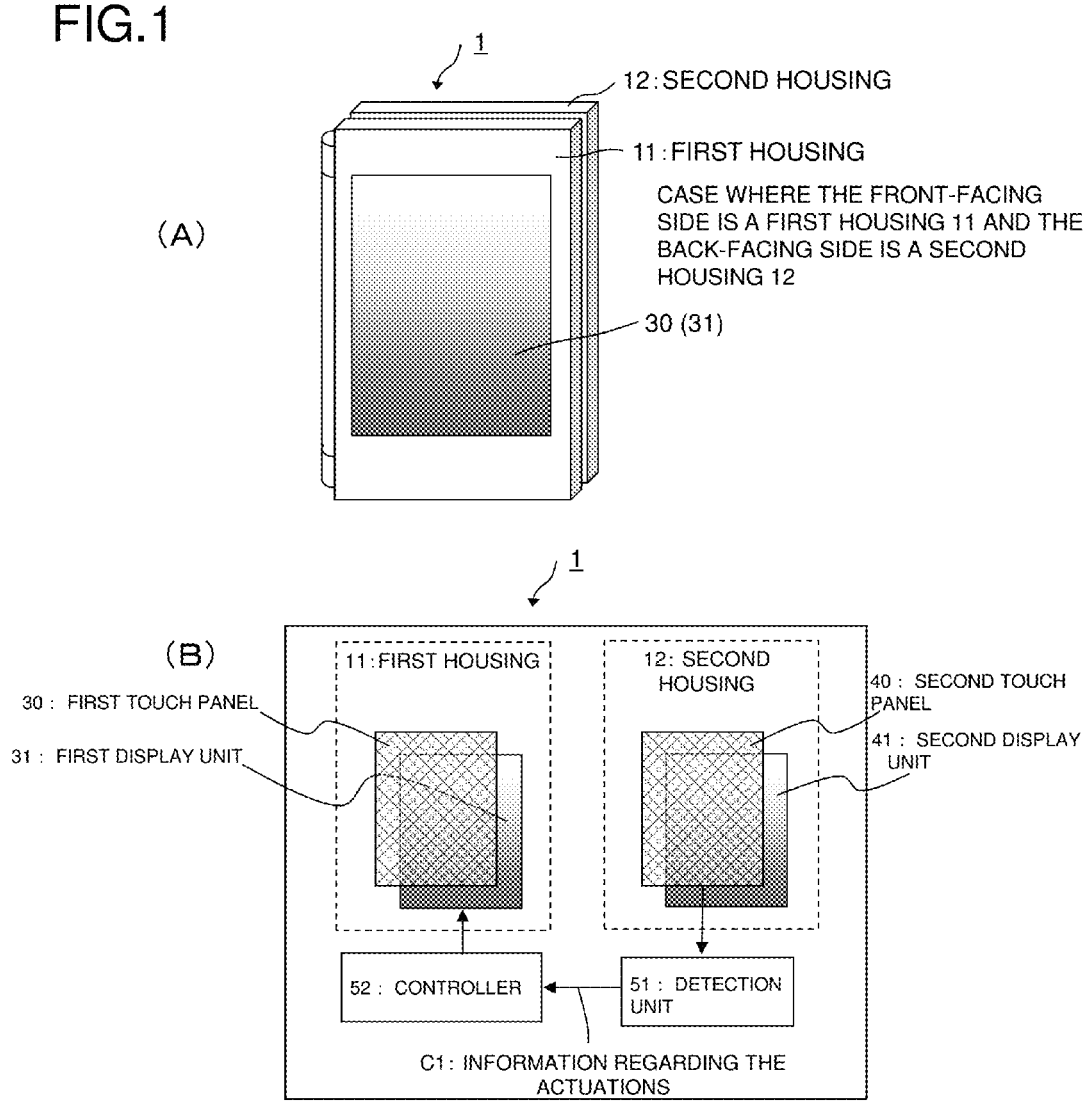
FIG. 1(A) and 1(B) are perspective views showing a configuration of an information terminal according to an exemplary embodiment.
Figure 2:
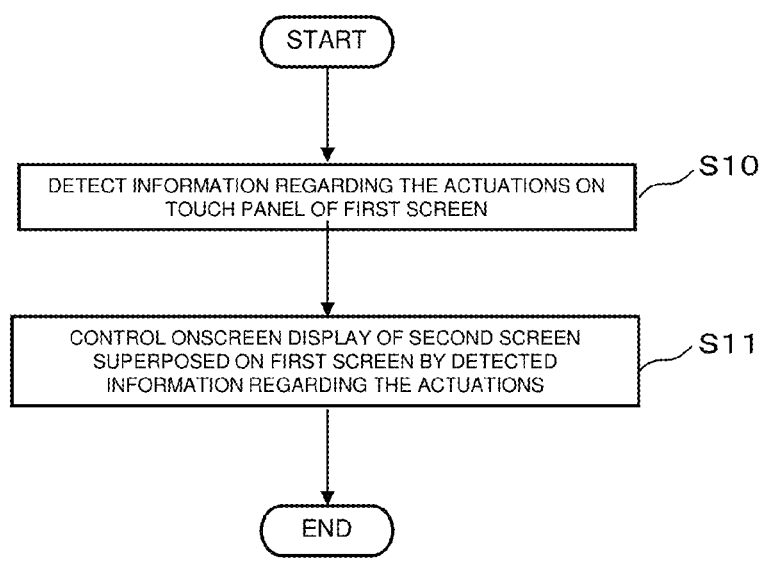
FIG. 2 is a flowchart for illustrating a display controlling method according to the exemplary embodiment.

Referring to FIG. 1, an information terminal 1 according to an exemplary embodiment includes a first housing 11 and a second housing 12, interconnected for being opened and closed relative to each other. The information terminal 1 also includes a first display unit 31 as well as a first touch panel 30 stacked one on the other on the first housing 11, and a second display unit 41 as well as a second touch panel 40 stacked one on the other on the second housing 12. The information terminal 1 also includes a detection unit 51 that detects operations made on one of the first touch panel and the second touch panels (30, 40) which, in the closed state with the first and second display units (31, 41) superposed one upon the other and facing outwards, viz., in the state shown in FIG. 1(A), is back-facing when seen from a user. The information terminal 1 further includes a controller 52 which, based on information regarding the actuations C1 detected by the detection unit 51, controls an onscreen display of one of the first and second display units (31, 41) which is front-facing when seen from the user.

In the above configuration, the onscreen display of the display unit disposed so as to be front-facing when seen from the user is controlled on the basis of the information regarding the actuations C1 obtained by detecting actuations on the touch panel which happens to be back-facing. It is thus possible to provide an information terminal improved in ease in the touch panel operations.

It is noted that FIG. 1(A) shows the information terminal 1 when it is gripped by the user so that the first housing 11 is front-facing and the second housing 12 is back-facing. In such case, the detection unit 51 detects user's actuations on the second touch panel 40, while the controller 52 controls the onscreen display of the first display unit 31 based on the information regarding the actuations C1. The user is also able to grip the information terminal 1 so that the second housing 12 will be front-facing and the first housing 11 back-facing. In such case, the detection unit 51 detects user's actuations on the first touch panel 30, while the controller 52 controls the onscreen display of the second display unit 41 based on the information regarding the actuations C1.

Figure 4:
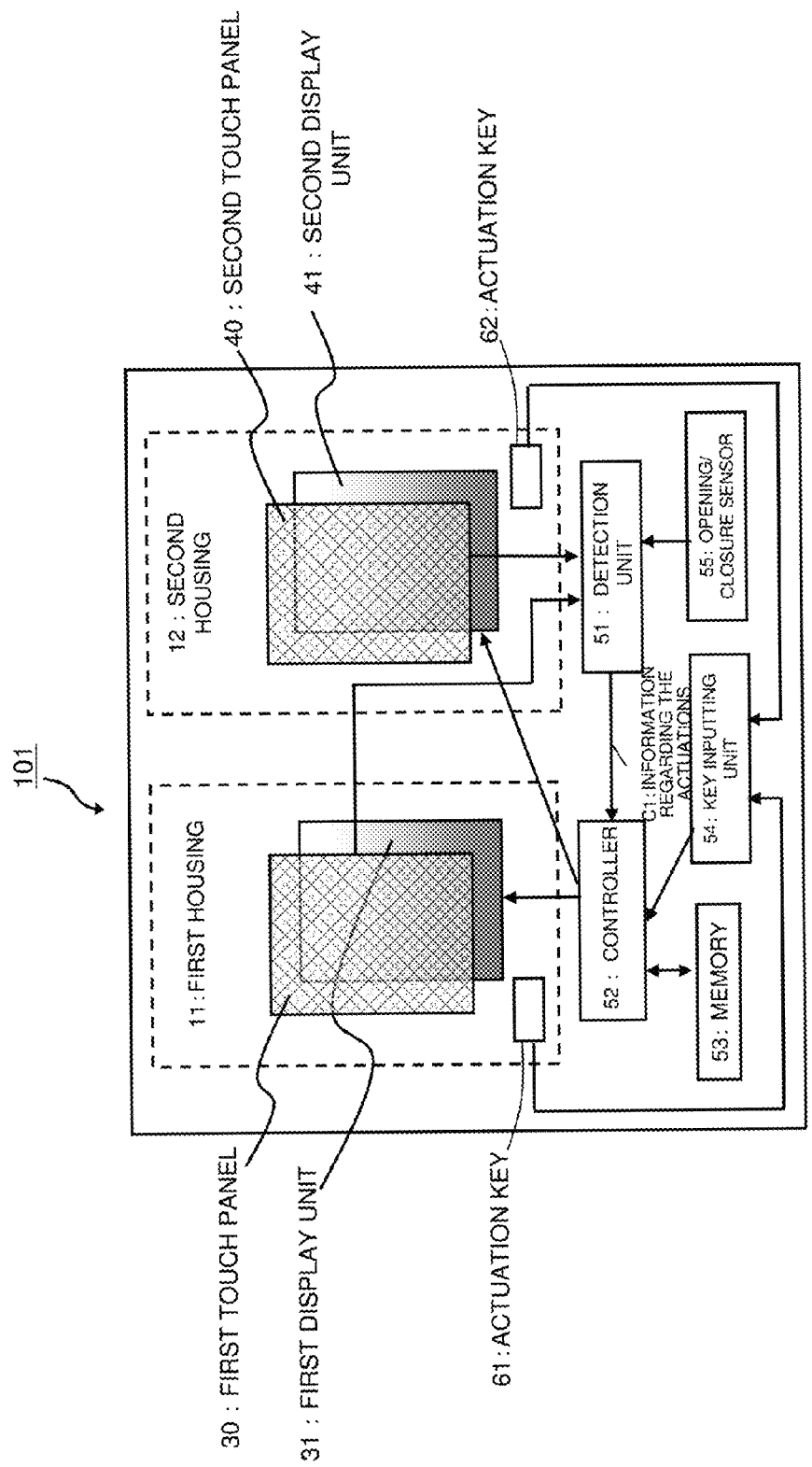
FIG. 4 is a block diagram showing a configuration of the information terminal according to the exemplary embodiment 1.

Referring to FIG. 4, an information terminal 101 also includes, for the information terminal 1 (FIG. 1), an opening/closure sensor 55 that detects the state of opening/closure of the first and second housings (11, 12). When the opening/closure sensor 55 has detected the state of closure, it is possible to control the onscreen display of the first or second display unit which happens to be front-facing, for example, the onscreen display of the first display unit 31 in the case of FIG. 1(A), based on the information regarding the actuations C1.

If, in the above described information terminal 101, the opening/closure sensor 55 has detected the closed state, the controller 52 preferably turns off the power supply of the display unit which happens to be back-facing. In the case of FIG. 1(A), for example, preferably the power supply of the second display unit 41 is turned off.

In the above described information terminal 101, the first and second housings (11, 12) may respectively be provided with actuation keys (61, 62). In such case, the controller 52 may deem that the housing that has detected the actuation on the actuation keys (61, 62) in the closed state is the front-facing housing.

Figure 13:
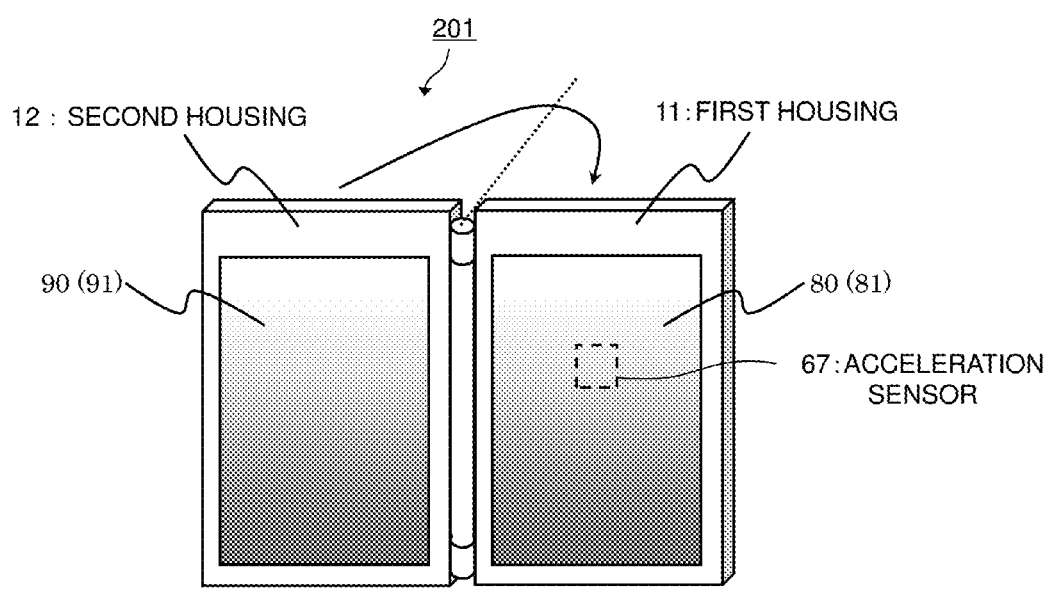
FIG. 13 is a perspective view showing a configuration of an information terminal according to an exemplary embodiment 2.
Figure 14:
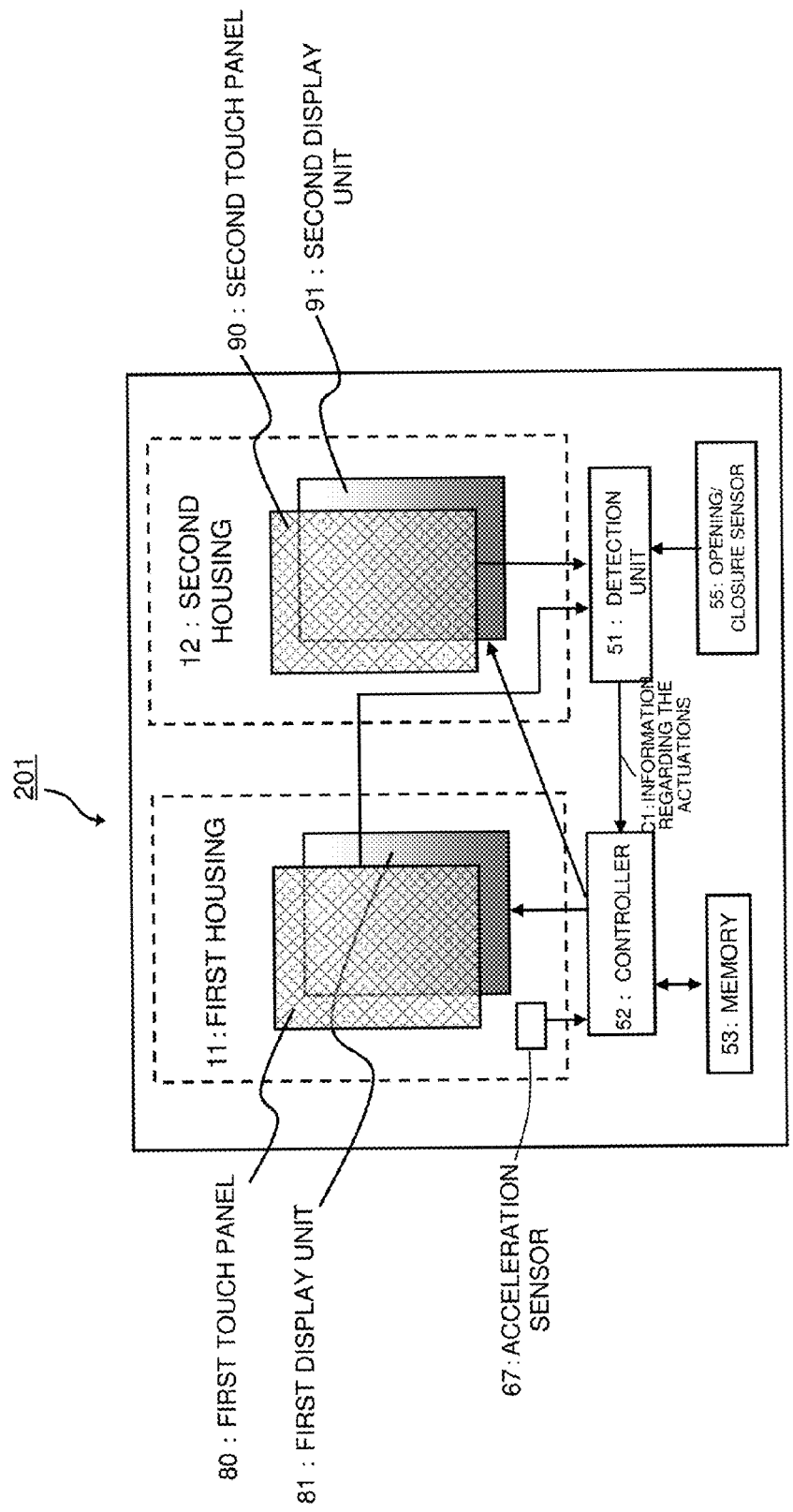
FIG. 14 is a block diagram showing a configuration of the information terminal according to the exemplary embodiment 2.

An information terminal 201 may further be provided with an acceleration sensor 67, as shown in FIG. 13 or FIG. 14. In such case, the controller 52 may distinguish between the front-facing and the back-facing housings from each other in the state of closure based on detection by the acceleration sensor 67.

In the above described information terminals (1, 101, 201 etc.), the controller 52 may control the onscreen display of the display unit which happens to be front-facing based on the information regarding the actuations C1 the detection unit 51 has detected in a specified region (such as regions 64a, 64b of FIG. 11) of the back-facing touch panel. The information regarding the actuations detected by the detection unit 51 in a region other than the above mentioned specified region (such as region 64a or 64b of FIG. 11) may then not be used in controlling the onscreen display.

In the above described information terminals (1, 101, 201 etc.), the controller 52 may carry out first screen control, such as screen scrolling, in case of detection by the detection unit 51 of a user's finger sliding over the screen of the touch panel which happens to be back-facing.

In the above described information terminals (1, 101, 201 etc.), the controller 52 may carry out second screen control, such as enlarging or shrinkage, in case of detection by the detection unit 51 not only of the user's finger sliding over the screen of the back-facing touch panel but also of an actuation on the front-facing touch panel.

In an exemplary embodiment, a display control method is a method for controlling a display on a first screen and a display on a second screen which may be superposed on the first screen. The first screen may, for example be a screen of the first display unit 31 of FIG. 1 and the second screen a screen of the second screen superposed on the first screen, such as a screen of the second display unit 41 of FIG. 1. The display control method may include a step (S10) of detecting actuations on a touch panel mounted on the first screen or the second screen that happens to be back-facing as seen from a user, and a step (S11) of controlling the display on the first or second screen that happens to be front-facing as seen from the viewer, based on information regarding the actuations C1 as detected in the detection step (S11).

Preferred exemplary embodiments will now be described in detail with reference to the drawings.

[Exemplary Embodiment 1]

(Configuration of Exemplary Embodiment 1)

Figure 3:
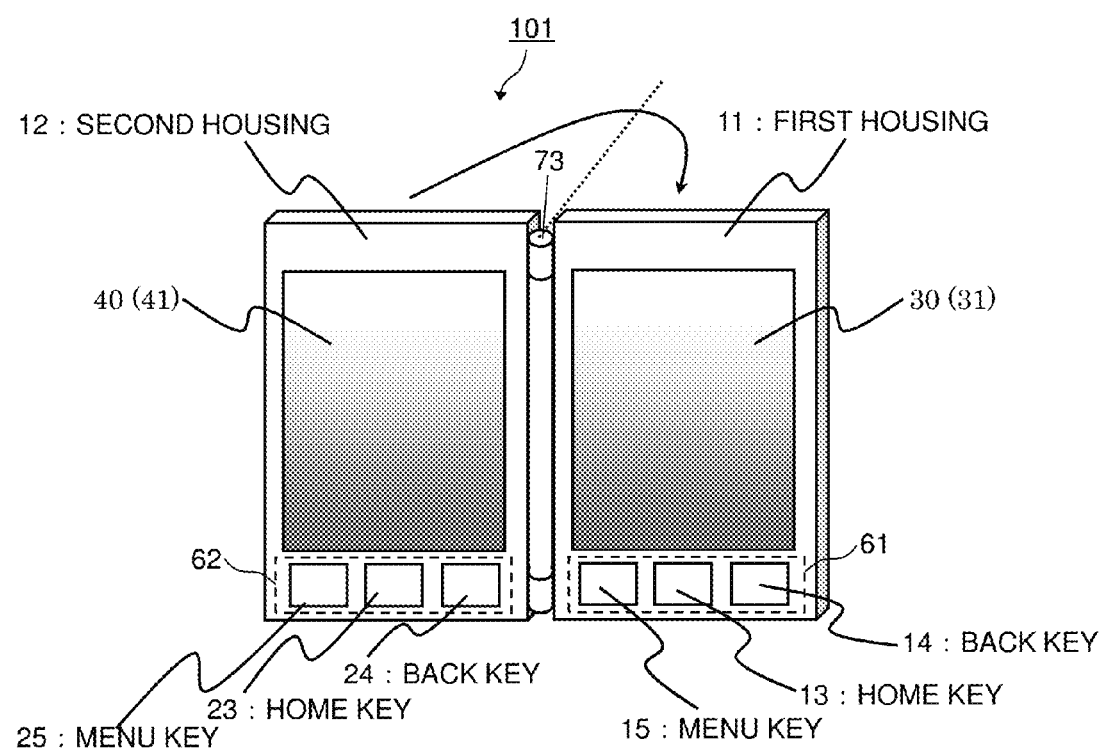
FIG. 3 is a perspective view showing a configuration of an information terminal according to the exemplary embodiment 1.

The information terminal 101 of the exemplary embodiment 1 will now be described with reference to FIG. 3 to FIG. 7. FIG. 3 depicts a perspective view showing a configuration of the information terminal 101 according to the exemplary embodiment 1. Referring to FIG. 3, the information terminal 101 is a two-screen smartphone constituted by a first housing 11 and a second housing 12 interconnected for opening/closing. A display unit and a touch panel are provided to each of the first and second housings. Specifically, the first display unit 31 and the first touch panel 30 are arranged superposed on the first housing 11, while the second display unit 41 and the second touch panel 40 are arranged superposed on the second housing 12.

The information terminal 101 can be used in the 'opened state', shown in FIG. 3, while it can also be used in the 'closed state' shown in FIG. 1(A). When the information terminal 101 is in the 'opened state', it operates in the 'two screen display mode' in which display is made on the screens of the two display units (31, 41). When the information terminal 101 is in the 'closed state', it operates in the 'one screen display mode' in which display is made only on one of the display units. By the way, the 'closed state' is meant the state in which the first display unit 31 and the second display unit 41 are facing outwards while being superposed or in contact with each other.

When the user grips the information terminal 101 in the closed state with his/her single hand, he/she may grip it so that, as shown in FIG. 1(A), the first housing 11 is front-facing and the second housing 12 is back-facing as seen by the user. The user may also grip the information terminal in a converse way, that is, so that the second housing 12 is front-facing and the first housing 11 back-facing.

However, the information terminal 101 is usually gripped in the following manner depending on the user's handedness. If the user is right-handed, he/she grips the information terminal with his/her left hand, whereas, if the user is left-handed, he/she grips it with his/her right hand. Also, if the user grips the information terminal 101 so that a hinge 73 of the information terminal touches the palm of his/her hand, the user feels easy and relaxed in gripping the information terminal. From the foregoing, it may be said that a right-handed user grips the information terminal with his/her left hand, in a majority of cases, so that the palm of his/her left hand touches the hinge 73, with the first housing 11 front-facing and with the housing 12 back-facing, as shown in FIG. 1(A). Conversely, a left-handed user grips the information terminal with his/her right hand, in a majority of cases, so that the palm of his/her right hand touches the hinge 73, with the second housing 12 front-facing and the first housing 11 back-facing.

The information terminal 101 is thus configured so that an action for actuation on the touch panel as well as onscreen display of the display unit may be made no matter which of the first housing 11 and the second housing 12 happens to be front-facing. Moreover, in the exemplary embodiment 1, it is envisaged to improve operability in many points in the one-screen display mode in the closed state, as will be discussed hereinafter in detail.

It is noted that coordinate data along the short side direction of the touch panel, which happens to be back-facing in the closed state, are inverted from those when the information terminal is in the opened state, so that the coordinates of the touch panel which happens to be back-facing will correspond to those of the touch panel which happens to be front-facing.

Returning to FIG. 3, the configuration of the information terminal 101 will be explained in further detail. In the information terminal 101, the first housing 11 and the second housing 12 are interconnected by the hinge 73 for performing opening/closing movements. The first display unit 31 and the second display unit 41 are each formed e.g., by an LCD (liquid crystal display), and perform a variety of functions for making onscreen display. The first touch panel 30 and the second touch panel 40 are touch panels of the capacitance detection system, suitable for smartphones or the like, and detect contact, pressing or approaching of the user's finger.

Referring to FIG. 3, the first housing 11 includes, downwardly of the first display unit 31, a series of actuation keys 61 comprised of a menu key 15, a home key 13 and a back key 14. Pressing the menu key 15 invokes displaying a picture for setting, while pressing invokes displaying the home picture and pressing the home key 13 invokes displaying a home picture. Pressing and holding the home key 13 demonstrates an application recently used. Pressing the back key 14 reverts to the directly preceding picture.

Similarly, the second housing 12 includes, downwardly of the second display unit 41, a series of actuation keys 62 comprised of a menu key 25, a home key 23 and a back key 24, the functions of which are the same as those of the menu key 15, home key 13 and the back key 14 of the first housing 11.

Referring to FIG. 4, the configuration of respective components of the information terminal 101 will be explained in detail. In FIG. 4, the components explained with reference to FIG. 3 are shown in a region enclosed by broken lines. Further, the information terminal 101 includes a detection unit 51, a controller 52, a memory 53, a key inputting unit 54 and an opening/closure sensor 55. The controller 52 includes a CPU (Central Processing Unit) to exercise control on the information terminal 101 in its entirety. The controller 52 controls onscreen display of the first display unit 31 and on that of the second display unit 41.

The memory 53 is made up of a ROM (read only memory) and a RAM (random access memory) and includes a work area, a program area and a data area. In the work area of the memory 53, various register data and flag data, used for processing by the controller 52, are temporarily stored. In the program area of the memory 53, various programs, executed by the CPU of the controller 52, are stored. In the data area of the memory 53, pictures shot by a user with a camera, E-mail data, voice data and so forth, are stored in addition to picture data making up a variety of operating pictures displayed.

The detection unit 51 detects actuation inputs to the first touch panel 30 and the second touch panel 40 to acquire the information regarding the actuations C1. Examples of the information regarding the actuations C1 include contents of actuations detected by the touch panels, such as touch, press and hold, drag or pinch, and the coordinate information involved in the respective actuations.

The opening/closure sensor 55 is made up of a magnet disposed on one of the housings and a magnetic sensor mounted on the other housing. The magnet and the magnetic sensor are arranged so as to be disposed close to each other in the closed state of the first and second housings (11, 12). With the above described configuration, the opening/closure sensor 55 detects whether the first and second housings are in the opened state or in the closed state, and outputs a signal of detection obtained to the detection unit 51.

The key inputting unit 54 detects the actuation inputs on the actuation keys 61, 62 to output the detected information to the controller 52.

In FIG. 4, the detection unit 51, controller 52, memory 53 and the key inputting unit 54 are shown as functional blocks. However, in the actual hardware configurations, each of the respective blocks may be mounted on whichever one of the first housing 11 and the second housing 12. By the way, the detection unit 51 may be separated into a detection subunit for the first touch panel and another detection subunit for the second touch panel, these subunits being then arranged on the respective housings. In similar manner, the key inputting unit 54 may be separated into a subunit for the actuation keys 61 and another subunit for the actuation keys 62, these subunits being then arranged on the respective housings.

(Operation of the Exemplary Embodiment 1)

Figure 5:
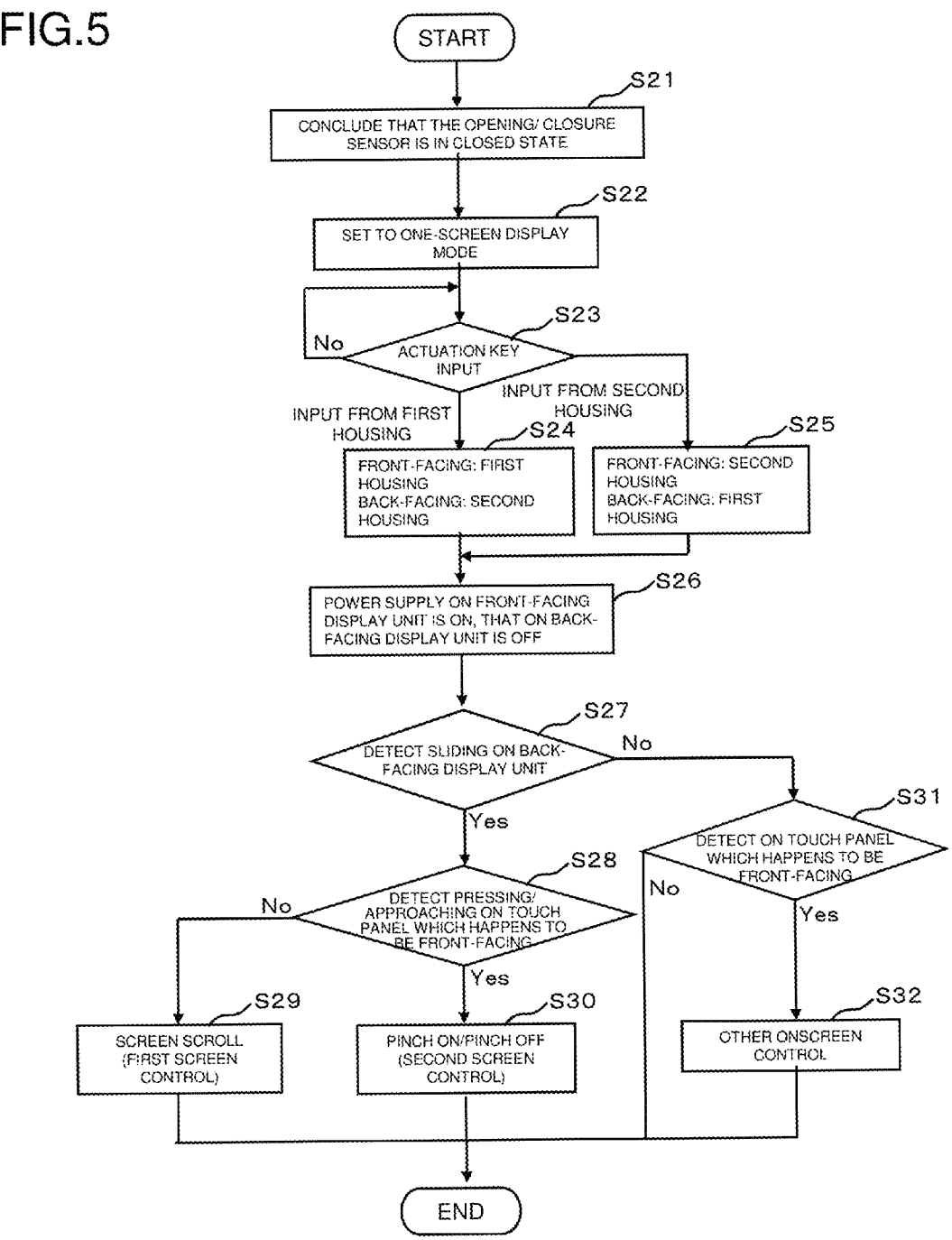
FIG. 5 is a flowchart for illustrating an operation of the information terminal according to the exemplary embodiment 1.

Referring to FIG. 5, the operation of the information terminal 101 of the exemplary embodiment1 will be explained. FIG. 5 depicts a flowchart showing the operation of the information terminal 101 of the exemplary embodiment 1.

Referring to FIG. 5, after the opening/closure sensor 55 has output that the state of the information terminal is the 'closed state' (S21), the controller 52 sets a one-screen display mode (S22). In the following explanation, which is made with reference to FIG. 5, it is assumed that the one-screen display mode has been selected.

In the one-screen mode, the controller 52 turns off the screens of the first display unit 31 and the second display unit 41 in an initial state. The key inputting unit 54 waits until detection of the user's actuation on the actuation keys 61, 62 (S23). If, in the step S23, the key inputting unit 54 has detected actuation on the actuation keys 61 of the first housing 11, that is, on any of the menu key 15, home key 13 or the back key 14, the controller 52 determines that the housing which happens to be front-facing as seen from the user is the first housing 11, with the back-facing housing being the second housing 12 (S24).

On the other hand, if, in the step S23, the key inputting unit 54 has detected actuation on the actuation key 62 of the second housing 12, that is, any of the menu key 25, home key 23 or the back key 24, the controller 52 determines that the housing which happens to be front-facing as seen from the user is the second housing 12, with the back-facing housing being the first housing 11 (S25).

The controller 52 turns on the power supply of the front-facing display unit, while turning off that of the back-facing display unit (S26). The controller 52 makes onscreen display on the front-facing display unit. Such case in which, in the initial state, the power supplies of both of the display units are turned off in the initial state, and the power supply of the front-facing display unit is turned on in the stage of S26, has been explained above. This is not limitative, such that, in the initial state, both of the display units may be turned on, or only one of the housings may be turned on. However, if once the front-facing housing has been determined in the step S23, the back-facing display unit is preferably turned off to save the power.

Figure 6:
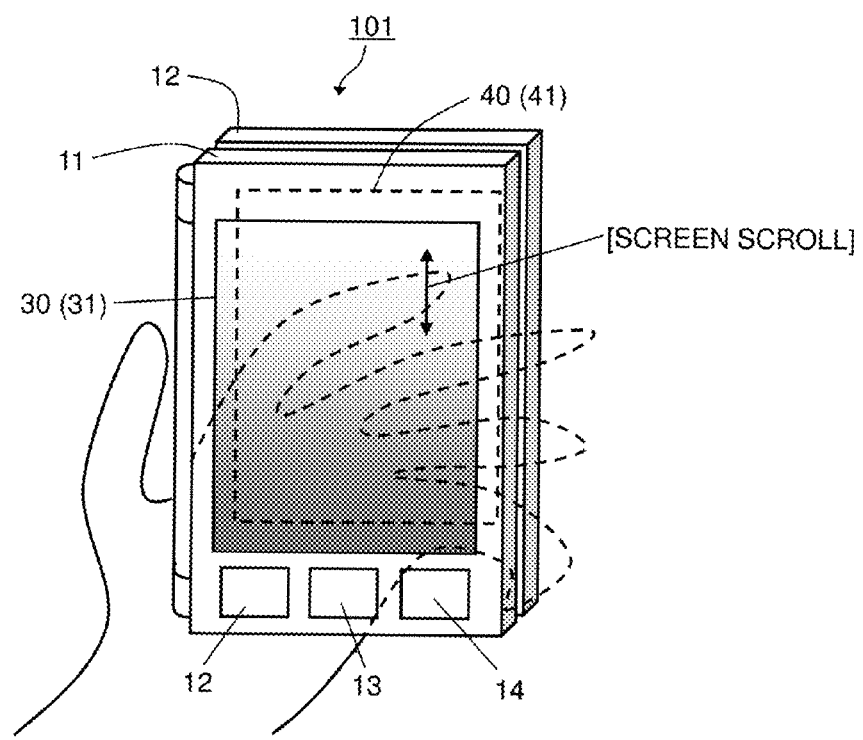
FIG. 6 is a perspective view for illustrating an operation of scrolling on a screen of the information terminal according to the exemplary embodiment 1.
Figure 7:
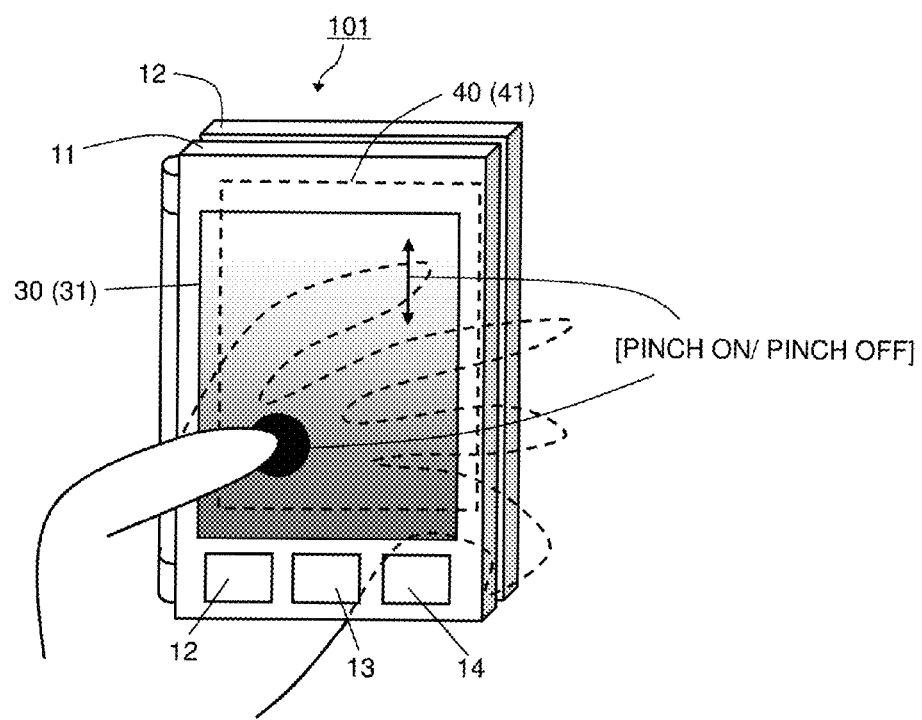
FIG. 7 is a perspective view showing an example pinch on/pinch off operation of the information terminal according to the exemplary embodiment 1.

Before proceeding to the explanation of the step S27 et seq., reference is made to FIG. 6 and FIG. 7 to illustrate the scrolling on a screen with the use of a touch panel which happens to be back-facing (first screen control) as well as enlarging and shrinkage (second screen control). First, FIG. 6 shows an operation in which a user grips the information terminal 101 with his/her left hand and scrolls on the screen. Referring to FIG. 6, if a user moves his/her index finger of his/her left hand by way of scrolling in an up-and-down direction over the touch panel which happens to be back-facing, the detection unit 51 detects the actuation of the user's finger sliding in the up-and-down direction. The detection unit 51 transmits the information regarding the actuations C1 detected to the controller 52. In response to the information regarding the actuations C1, the controller 52 performs scrolling on the screen of the front-facing display unit in the up-and-down direction.

In the routine scrolling over the smartphone screen, a user sets his/her finger on the front-facing display screen, so that the finger thus set on the screen hides the portion of the display below the finger from view. On the other hand, scrolling on a Web page in the up-and-down direction may be detected in a mistaken way to be a click operation so that display may jump to a link destination. Such problem may be circumvented in the scrolling on the screen, shown in FIG. 6, since the user moves his/her finger for sliding on the back-facing touch panel.

FIG. 7 shows an operation in which the user grips the information terminal 101 with his/her left hand to effect enlarging/shrinkage of a picture displayed. Referring to FIG. 7, the user puts his/her thumb finger on the touch panel which happens to be front-facing. In this state, the user causes his/her index finger to slide on the touch panel which happens to be back-facing. It is here assumed that, if the user moves his/her finger upwards, it is indicating the enlarging, whereas, if the user moves his/her finger downwards, it is indicating the shrinkage. The detection unit 51 detects an actuation input on the touch panel which happens to be front-facing and that on the touch panel which happens to be back-facing from the actuation inputs on the front-facing and back-facing panels, respectively. The detection unit 51 transmits the information regarding the actuations C1 detected to the controller 52. In response to the information regarding the actuations C1, the detection unit 51 enlarges or shrinks the picture on the display unit which happens to be front-facing.

Also, if, in the enlarging/shrinkage operation of FIG. 7, the user releases his/her thumb finger from the touch panel which happens to be front-facing, he/she may easily transfer to the operation of scrolling on the screen shown in FIG. 6. If conversely the user puts his/her finger on the touch panel which happens to be front-facing, during the operation of scrolling on the screen, he/she may transfer to the operation of enlarging/shrinkage shown in FIG. 7. That is, the user may optionally transfer from the enlarging/shrinkage operation to the operation of scrolling on the screen or vice versa to make onscreen display in a desired manner.

A routine smartphone offers to the user a pinch out/pinch in operation by way of realizing the enlarging/shrinkage operation. The pinch out/pinch in operation is such an operation in which, as the information terminal is held with the user's one hand, two fingers of the user's other hand are put on the touch panel and moved in a pinching or spreading direction. If the user spreads his/her two fingers apart from each other, the picture is enlarged, whereas, if the user pinchers his/her two fingers, the picture shrinks. This pinch out/pinch in operation, which may be intuitive and easy to understand, has a disadvantage that it cannot be realized with solely the hand holding the information terminal, that is, the enlarging/shrinkage operation cannot be performed with the user's single hand. Conversely, the enlarging/shrinkage operation, shown in FIG. 7, can be realized solely with the hand holding the information terminal 101, that is, with the user's single hand.

Returning to the flow chart of FIG. 5, the steps S27 or following will be explained. Initially, the detection unit 51 determines whether or not the slide operation on the touch panel which happens to be back-facing has been detected (S27). If the decision of the step S27 is YES, the detection unit 51 further determines whether or not the pressing/approaching of the finger on the touch panel which happens to be front-facing has been detected (S28). If the decision of the step S28 is NO, the information regarding the actuations C1 detected by the detection unit 51 is the information regarding scrolling on the screen. The controller 52 thus causes the front-facing display unit to execute scrolling on the screen by way of first screen control (S29).

If conversely the decision of the step S28 is YES, the information regarding the actuations C1 detected by the detection unit 51 is the enlarging/shrinkage information. The controller 52 thus causes the front-facing display unit to execute enlarging/shrinkage by way of second screen control (S30).

If the decision of the step S27 is NO, it is determined whether or not the detection unit 51 has detected the actuation on the touch panel which happens to be front-facing (S31). If the decision of the step S31 is YES, the controller 52 executes other control operations on the screen depending on the information regarding the actuations C1 on the touch panel which happens to be front-facing as detected by the detection unit 51 (S32).

In the exemplary embodiment 1, the actuation on the touch panel which happens to be back-facing includes the scrolling on the screen and enlarging/shrinkage, only by way of illustration. It is thus possible to add other actuations on the touch panel which happens to be back-facing or combinations of other actuations on the touch panel which happens to be back-facing and the touch panel which happens to be front-facing.

As described above, the following advantageous effects may be derived from the information terminal 101 of the exemplary embodiment 1.

First, scrolling on the screen is by actuations on the touch panel which happens to be back-facing, so that it is possible to effect scrolling on the screen without obstruction by the finger placed on the touch panel which happens to be front-facing. On the other hand, since the scrolling operation on the screen is performed on the back side and hence is distinguished from the operation of link selection on the front side, it is possible to prevent mistaken operations ascribable to mistaken input operations. In addition, the enlarging/shrinkage operation can be performed with a single hand by dint of the actuations on the touch panel which happens to be back-facing.

In the exemplary embodiment 1, described above, such an information terminal may be provided which will contribute to improving the ease in the touch panel actuations.
(Modification 1 of the Exemplary Embodiment 1)

Figure 8:
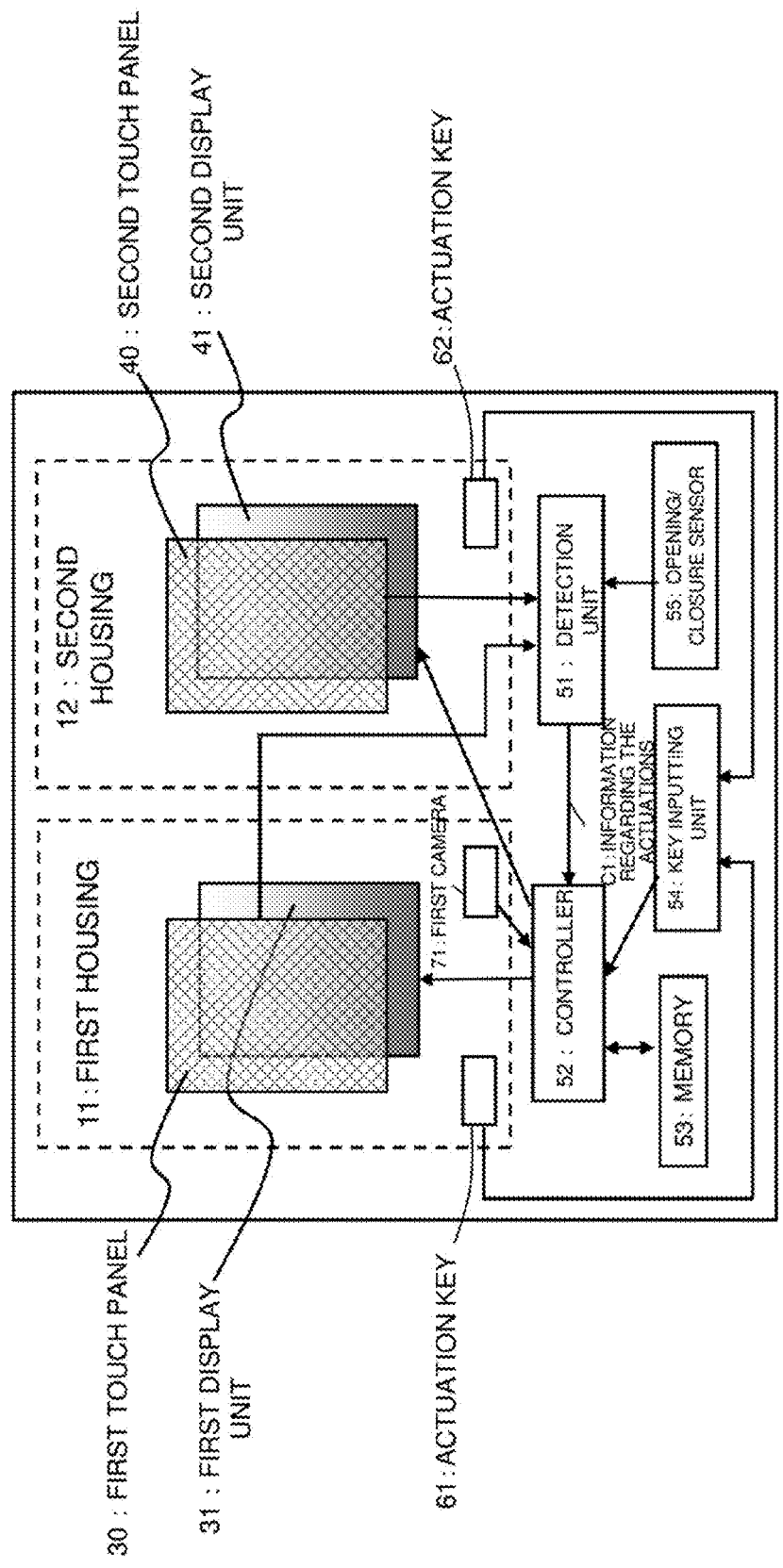
FIG. 8 is a block diagram showing a configuration of an information terminal according to a modification 1 of the exemplary embodiment 1.

Referring to FIG. 8, a modification 1 of the exemplary embodiment 1 will now be explained. FIG. 8 depicts a block diagram showing a configuration of an information terminal 102 according to the modification 1 of the exemplary embodiment 1. The information terminal 102 of FIG. 8 includes, as an image pickup means, a first camera 71 in the first housing 11. Otherwise, the present modification 1 is similar to the exemplary embodiment 1, and hence the same symbols are used as those of the exemplary embodiment 1 and any redundant explanation is dispensed with.

The first camera 71 performs the function of detecting a user's face and hence the housing which happens to be front-facing can be discerned. In the flowchart of FIG. 5, if it is determined by the opening/closure sensor that the information terminal is in the closed state, the step S23 is not carried out. Instead, the controller 52 boots the first camera 71 and, within a preset time as from the time of booting, it is determined whether or not a face is detected in the photographed picture. If the face is detected, the housing, which happens to be front-facing, is determined to be the first housing 11 where there is provided the first camera 71. If the face is not detected, the housing, which happens to be front-facing, is determined to be the second housing 12.

In the information terminal 102 according to the modification of the exemplary embodiment 1, there may be obtained, in addition to the advantageous effect of the exemplary embodiment 1, another advantageous effect that the front-facing housing can be determined automatically.
(Modification 2 of the Exemplary Embodiment 1)

Figure 9:
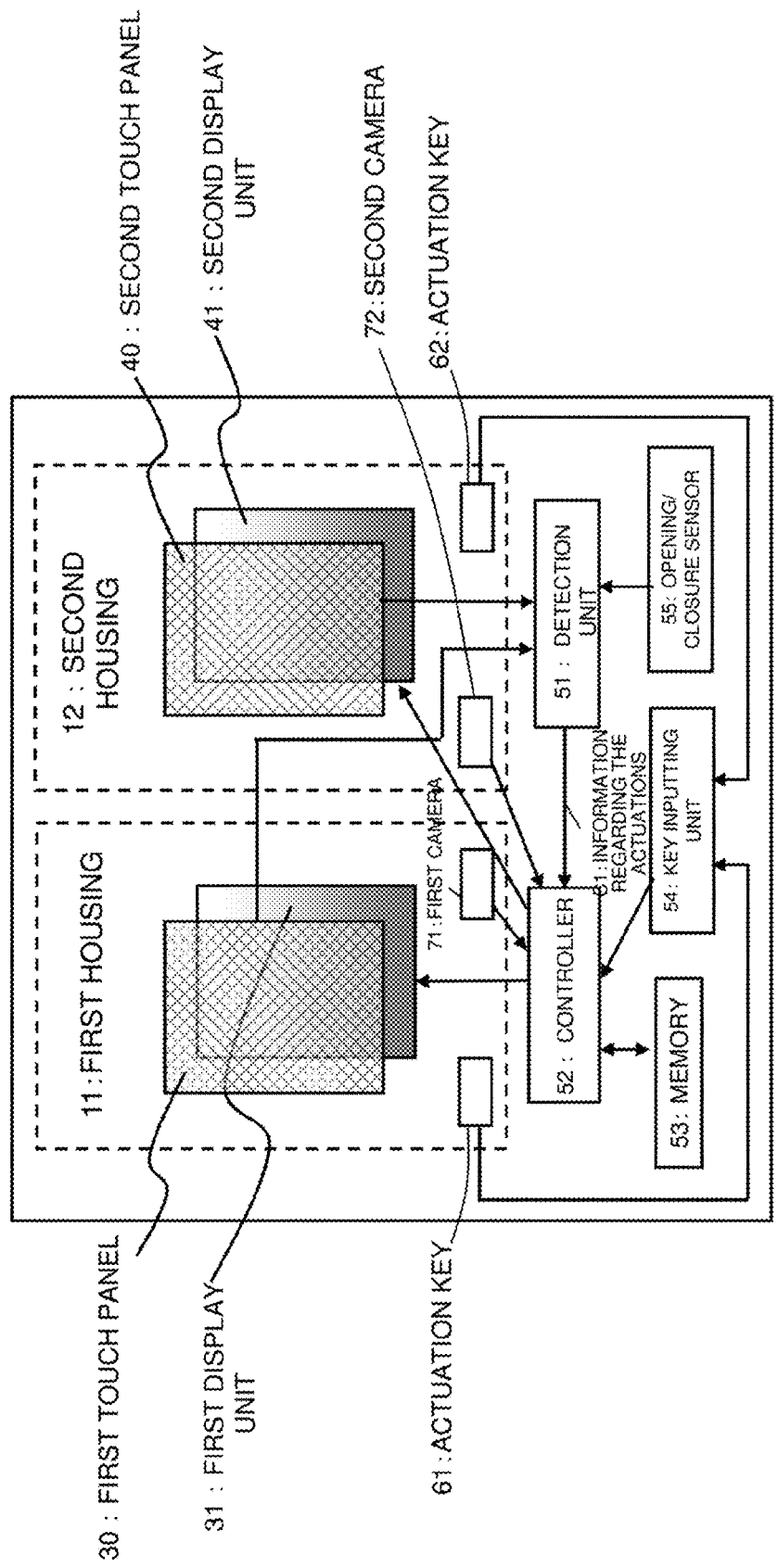
FIG. 9 is a block diagram showing a configuration of an information terminal according to a modification 2 of the exemplary embodiment 1.

Referring to FIG. 9, a modification 2 of the exemplary embodiment 1 will now be explained. FIG. 9 depicts a block diagram showing a configuration of an information terminal 103 according to the modification 2 of the exemplary embodiment 1. The information terminal 103 of FIG. 9 includes, as an image pickup means, a first camera 71 in the first housing 11 and a second camera 72 in the second housing 12. Otherwise, the present modification 2 is similar to the exemplary embodiment 1, and hence the same symbols are used as those of the exemplary embodiment 1 and any redundant explanation is dispensed with.

The first camera 71 and the second camera 72 perform the functions of detecting a user's face to decide on the housing which happens to be front-facing. If, in the flowchart of FIG. 5, the opening/closure sensor 55 has decided that the information terminal is in the closed state, the step S23 is not carried out. In its stead, the controller 52 boots the first camera 71 and the second camera 72 to decide whether or not the user's face is detected in either one of the photographed pictures within a preset time as from booting. If the user's face is detected on the first camera 71, it is concluded that the housing, which happens to be front-facing, is the first housing 11. If the user's face is detected on the second camera 72, it is concluded that the housing, which happens to be front-facing, is the second housing 12.

In the information terminal 103 according to the modification 2 of the exemplary embodiment 1, the housing, which happens to be front-facing, can be automatically determined as in the modification 1 of the exemplary embodiment 1.
(Modification 3 of the Exemplary Embodiment 1)

Figure 10:
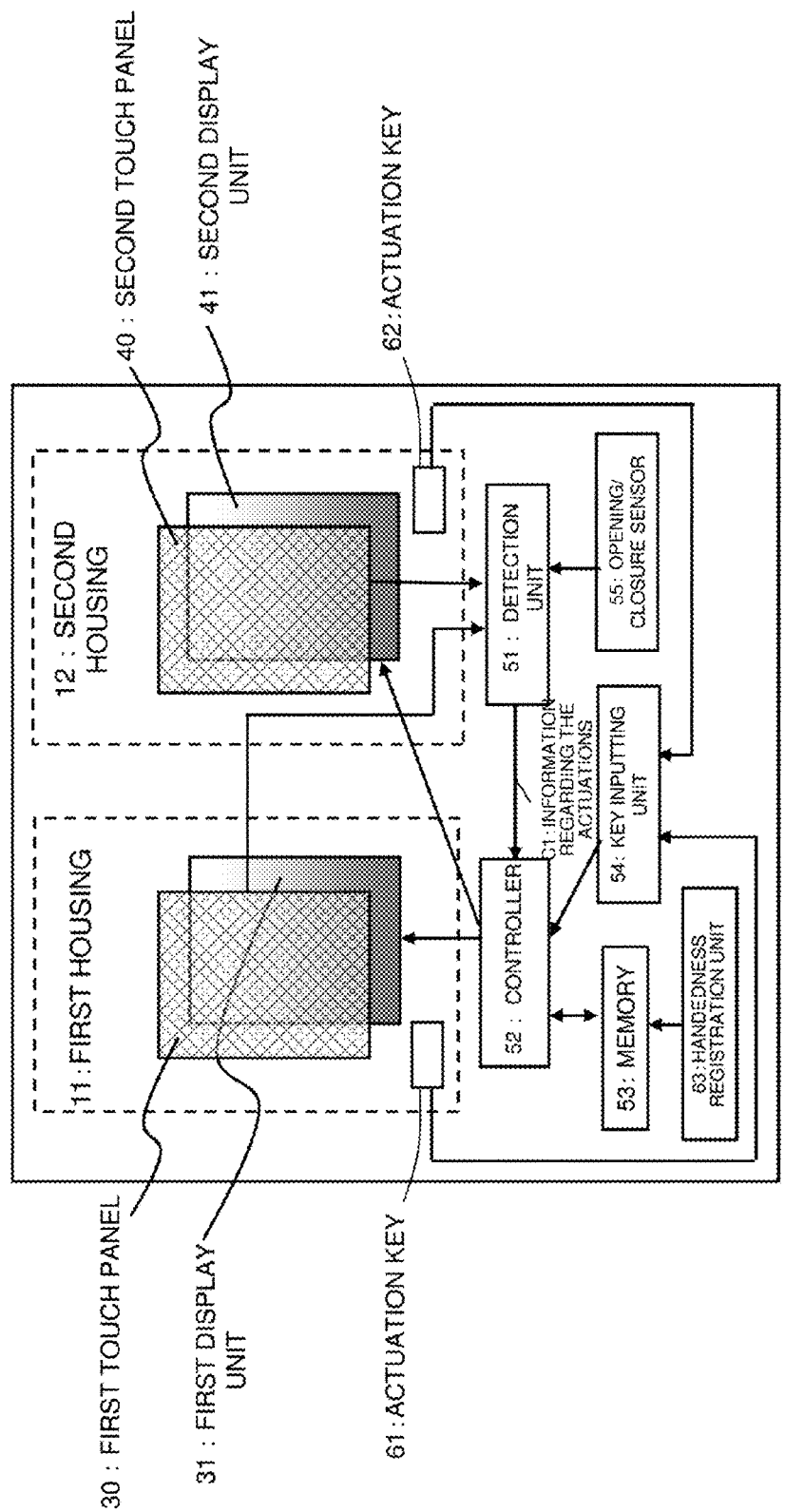
FIG. 10 is a block diagram showing the configuration of an information terminal according to a modification 3 of the exemplary embodiment 1.
Figure 11:
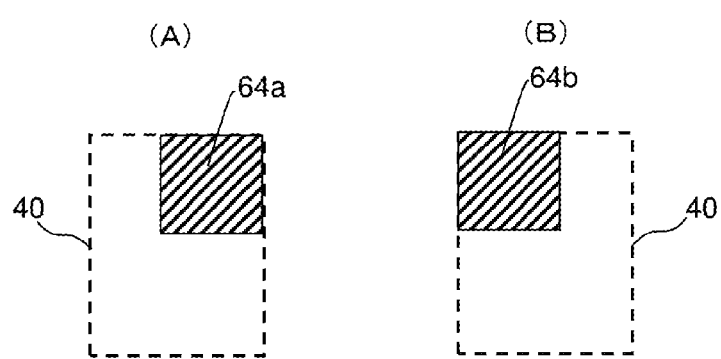

Referring to FIG. 10 and FIG. 11, a modification 3 of the exemplary embodiment 1 will be explained. FIG. 10 depicts a block diagram showing a configuration of an information terminal 104 according to the modification 3 of the exemplary embodiment 1. The information terminal 104 of FIG. 10 includes a handedness registration unit 63 as a new component. Otherwise, the present modification 3 is similar to the exemplary embodiment 1, and hence the same symbols are used as those of the exemplary embodiment 1, while any redundant explanation is dispensed with.

The user registers the information that he/she is right-handed or left-handed in the handedness registration unit 63. Here, it is presumed that, in a majority of cases, a right-handed user grips the information terminal with his/her left hand and a left-handed user grips it with his/her right hand. By the way, the information that the hand that grips the information terminal is the right hand or the left hand may be registered in place of registering the information regarding right-handedness or left-handedness.

In the modification 3 of the exemplary embodiment 1, the range of actuation on the touch panel which happens to be back-facing is restricted to a preset range depending on the user's handedness. In FIG. 11, the touch panel which happens to be back-facing is the second touch panel 40. If the user is right-handed, that is, if the hand that grips the information terminal is his/her left hand, the range of sliding movement of the index finger is restricted to a right upper area when seen from the user. Therefore, the range of actuation is a specified area 64a, as shown in FIG. 11(A). If the user is left-handed, that is, if the hand that grips the information terminal is his/her right hand, the range of sliding movement of the index finger is restricted to a left upper area when seen from the user. Therefore, the range of actuation is a specified area 64b, as shown in FIG. 11(B).

In this manner, the range of actuation on the touch panel which happens to be back-facing is selected so as to be the specified area 64a or the specified area 64b depending on the information regarding the user's handedness. Any actuation input detected in other than the selected specified area is taken to be invalid. By so doing, it is possible to prevent mistaken detection in case of unintentionally touching an area other than the specified area of the touch panel which happens to be back-facing.

In place of providing the handedness registration unit of FIG. 10, it is also possible to store the past information regarding the loci of finger movements on the touch panel which happens to be back-facing to automatically determine the user's handedness from the so stored information.

With the modification 3 of the exemplary embodiment 1, described above, such an advantageous effect that mistaken detection on the touch panel which happens to be back-facing may be prevented from occurring may be obtained in addition to the advantageous effect proper to the exemplary embodiment 1.

(Modification 4 of the Exemplary Embodiment 1)

Figure 12:
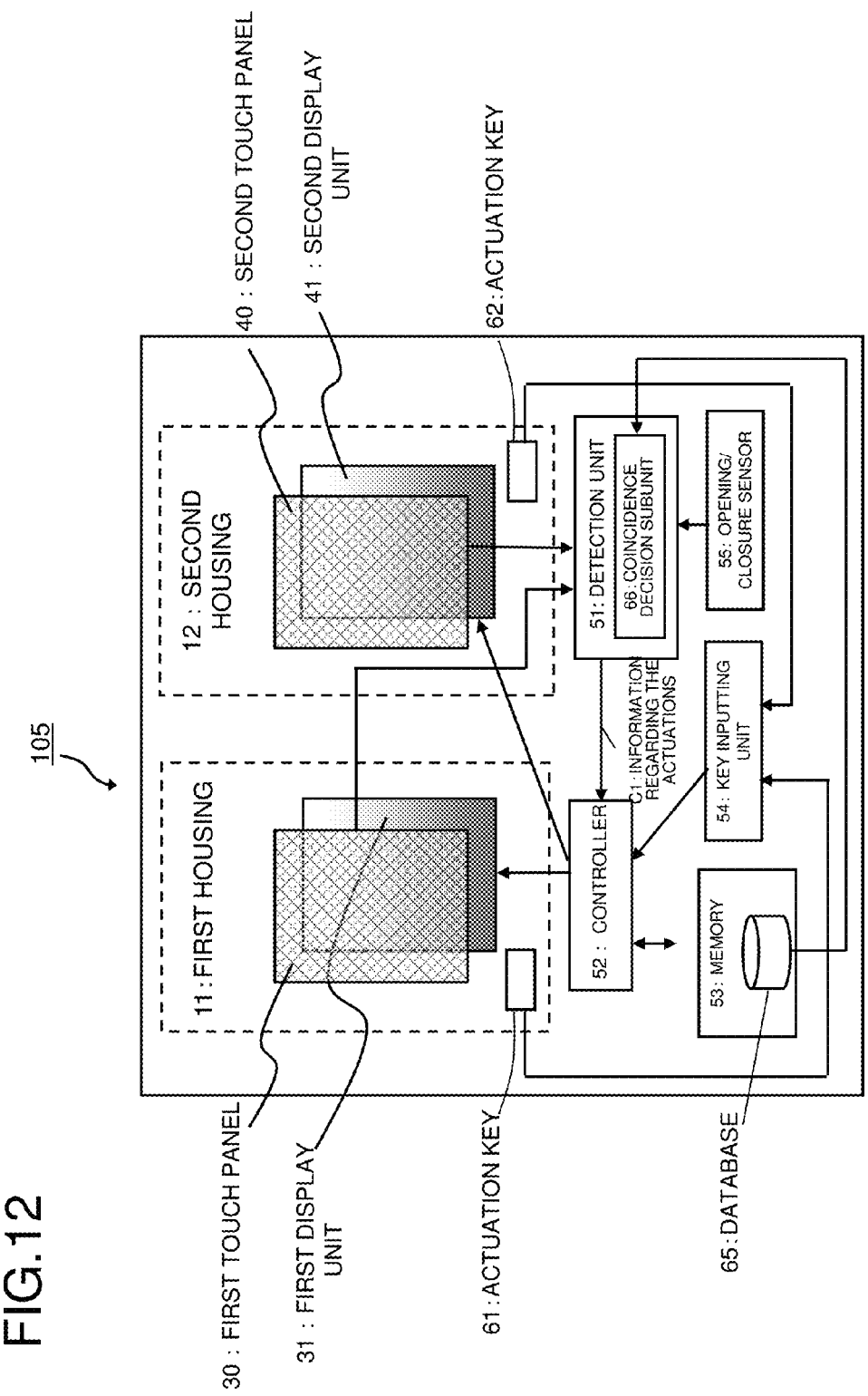
FIG. 12 is a block diagram showing a configuration of an information terminal according to a modification 4 of the exemplary embodiment 1.

Referring to FIG. 12, a modification 4 of the exemplary embodiment 1 will now be explained. FIG. 12 depicts a block diagram showing a configuration of an information terminal 105 according to the modification 4 of the exemplary embodiment 1. An information terminal 105 of FIG. 12 includes, as new components, a database 65 of the memory 53 and a coincidence decision subunit 66 of the detection unit 51. The database 65 has stored therein past loci of finger movements on the touch panel which happens to be back-facing. By the information thus stored, the trend of the user's actuations can be grasped statistically. The coincidence decision subunit 66 calculates the degree of coincidence of the loci of the finger movements, detected at the present moment, with respect to the statistical data. If the degree of coincidence is higher than a preset threshold value, the actuation input is taken to be valid. However, if the degree of coincidence is not higher than a preset threshold value, the actuation input is taken to be invalid. By so doing, it is possible to prevent mistaken detection in case of the user unintentionally touching the touch panel which happens to be back-facing.

As described above, in the modification 4 of the exemplary embodiment 1, such an advantageous effect that mistaken detection on the touch panel which happens to be back-facing may be prevented from occurring may be obtained in addition to the advantageous effect proper to the exemplary embodiment 1.

[Exemplary Embodiment 2]

Figure 15:
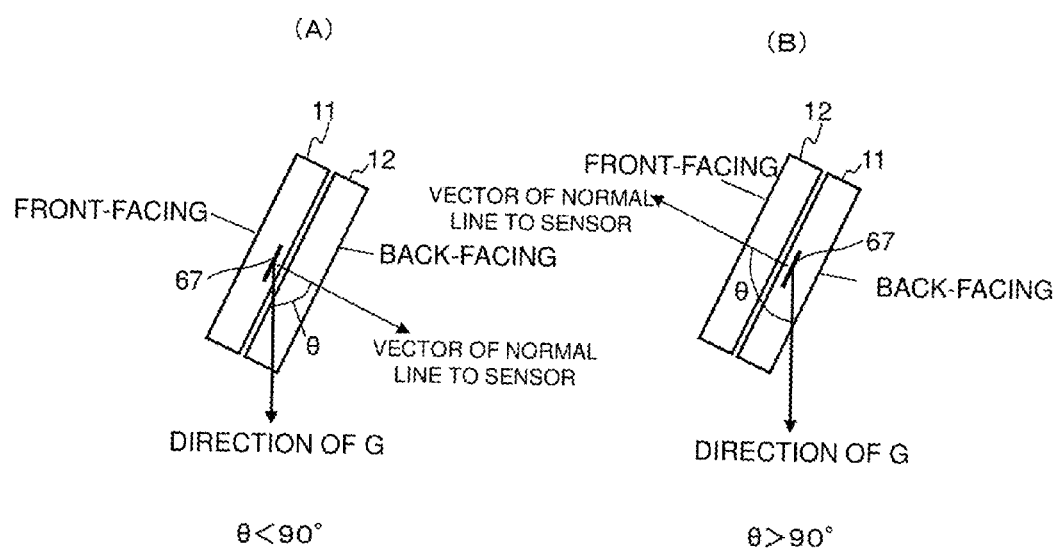
FIG. 15(A) and FIG. 15(B) are schematic views for illustrating an acceleration sensor in the information terminal according to the exemplary embodiment 2.

An exemplary embodiment 2 will now be explained with reference to FIG. 13 to FIG. 15. FIG. 13 depicts a perspective view showing an information terminal 201 of the exemplary embodiment 2. As may be seen on comparing FIG. 13 to FIG. 4 (exemplary embodiment 1), the information terminal 201 of FIG. 13 is freed of the actuation keys 61, 62 to provide for a larger area of the screen surfaces of first and second display units (81, 91). The menu keys, home keys and back keys, contained in the actuation keys 61, 62, are replaced by equivalent keys constructed using software techniques.

An acceleration sensor 67 is provided in one of the housings of the information terminal 201 of FIG. 13. In this figure, the acceleration sensor 67 is provided in the first housing 11. The acceleration sensor 67 is capable of detecting the direction of the gravitational force (direction of G). FIG. 15(A) shows a case where the first housing 11 is front-facing. In this case, an angle θ which the vector of a normal line to the acceleration sensor makes with the direction of the gravitational force becomes smaller than 90°. On the other hand, FIG. 15(B) shows a case where the second housing 12 is front-facing. In this case, an angle θ which the vector of the normal line to the acceleration sensor makes with the direction of the gravitational force becomes larger than 90°. From the foregoing, the housing that happens to be front-facing can be determined depending on whether the angle θ as detected by the acceleration sensor 67 is smaller or greater than 90°.

Since the housing that happens to be front-facing can be determined by the acceleration sensor 67, it is unnecessary to decide the housing that happens to be front-facing by the operation of the actuation keys 61, 62. It is thus possible to remove the actuation keys 61, 62 and equivalent keys constructed by software techniques may be used to provide for a larger area of the screen surface.

FIG. 14 depicts a block diagram showing the configuration of the information terminal 201 of the exemplary embodiment 2. As may be seen on comparing FIG. 14 to FIG. 4 (exemplary embodiment 1), the information terminal 201 of FIG. 14 is freed of the actuation keys 61, 62 as well as the key inputting unit of FIG. 4, while being added by the acceleration sensor 67. In the operation of the information terminal 201, the step S23 of FIG. 5 is removed and, in its stead, the acceleration sensor 67 detects the angle θ by means of which the housing that happens to be front-facing may be determined. Otherwise, the steps of FIG. 5 remain unchanged.

With the exemplary embodiment 2, described above, there may be obtained, in addition to the effect of the exemplary embodiment 1, an additional favorable effect that the housing that happens to be front-facing may automatically be decided by means of the acceleration sensor.

By the way, respective processing operations, executed by the controller 52 in the respective exemplary embodiments, such as S21 to S32 of FIG. 5, are stored as a program in the memory 53 so as to be invoked and executed by a computer provided in the controller 52. The program can be downloaded over a network or updated using a recording medium on which the program has been stored.

The present invention may properly be applied to information terminals, provided with touch panels in general, for example, to a mobile phone, a smartphone, a gaming machine, a tablet PC (personal computer), a notebook PC or to a PDA (personal data assistant; mobile information terminal).

The exemplary embodiments or Examples may be modified or adjusted within the concept of the total disclosures of the present invention, inclusive of claims, based on the fundamental technical concept of the invention. A series of combinations or selections of elements herein disclosed (elements of claims, Examples and drawings) may be made within the context of the claims of the present invention. That is, the present invention may include a wide variety of changes or corrections that may occur to those skilled in the art in accordance with the total disclosures inclusive of the claims and the drawings as well as the technical concept of the invention. In particular, it should be understood that any optional numerical figures or sub-ranges contained in the ranges of numerical values set out herein ought to be construed to be specifically stated even in the absence of explicit statements.

Part or all of the above described exemplary embodiments may also be stated substantially as follows:

(Mode 1)

An information terminal comprising:

a first housing and a second housing interconnected for opening/closure;

a first display unit and a first touch panel stacked one upon the other on the first housing;

a second display unit and a second touch panel stacked one upon the other on the second housing;

a detection unit which, in a closed state with the first and second display units superposed one upon the other and facing outwards, detects actuations on one of the first touch panel and the second touch panel that happens to be back-facing; and a controller that controls an onscreen display on one of the first display unit and the second display unit that happens to be front-facing, based on information regarding the actuations detected by the detection unit.

(Mode 2)

The information terminal according to mode 1, further comprising an opening/closure sensor that detects an opened/closed state of the first and second housings; wherein, in case the opening/closure sensor has detected the closed state, the controller controls the onscreen display on the display unit that happens to be front-facing based on the information regarding the actuations.

(Mode 3)

The information terminal according to mode 2, wherein, in case the opening/closure sensor has detected the closed state, opening/closure sensor turns off a power supply of the display unit that happens to be back-facing.

(Mode 4)

The information terminal according to mode 2 or 3, wherein, in case the opening/closure sensor has detected the opened state, the controller controls the onscreen displays of both the first and second display units.

(Mode 5)

The information terminal according to any one of modes 1 to 4, wherein, each of the first and second housings includes an actuation key; and wherein, the controller determines the housing, inputting to which by the actuation key has been detected in the closed state, as being the front-facing housing.

(Mode 6)

The information terminal according to any one of modes 1 to 4, further comprising an acceleration sensor; wherein, the controller in the closed state identifies the touch panel which happens to be front-facing based on detection by the acceleration sensor.

(Mode 7)

The information terminal according to any one of modes 1 to 4, further comprising an image pickup means in one of the first and second housings; wherein, if the image pickup means has detected a face, the controller determines the housing provided with the image pickup means to be front-facing.

(Mode 8)

The information terminal according to any one of modes 1 to 4, wherein, each of the first and second housings includes an image pickup means; wherein, when the image pickup means of the first housing detects a face, the controller determines the first housing to be front-facing; and wherein, when the image pickup means of the second housing detects a face, the controller determines the second housing to be front-facing.

(Mode 9)

The information terminal according to any one of modes 1 to 8, wherein, the controller controls onscreen display of the front-facing display unit based on the information regarding the actuations detected from a specified area of the touch panel which happens to be back-facing;

the controller not using the information regarding the actuations detected in an area other than the specified area in controlling onscreen display.

(Mode 10)

The information terminal according to mode 9, further comprising a handedness decision means that determines the handedness of the user; wherein, the specified area is selected from among a plurality of specified area candidates based on the information regarding the handedness obtained by the handedness decision means.

(Mode 11)

The information terminal according to mode 9, wherein, user's handedness is registered; and wherein, the specified area is selected from among the specified area candidates based on the information regarding the user's handedness registered.

(Mode 12)

The information terminal according to any one of modes 1 to 11, wherein, the controller manages first screen control when the detection unit has detected a finger slide movement on the touch panel which happens to be back-facing.

(Mode 13)

The information terminal according to mode 12, wherein, the first screen control is scrolling on a screen.

(Mode 14)

The information terminal according to any one of modes 1 to 11, wherein, the controller manages second screen control when the detection unit has detected a finger slide movement on the touch panel which happens to be back-facing and when the detection unit has detected an inputting on the touch panel which happens to be front-facing.

(Mode 15)

The information terminal according to mode 14, wherein, the second screen control is enlarging/shrinkage.

(Mode 16)

The information terminal according to any one of modes 1 to 15, wherein, loci of finger movements regarding a preset actuation on the touch panel which happens to be back-facing are stored beforehand; and wherein, the detection unit determines the degree of coincidence of the actuation on the touch panel which happens to be back-facing with the loci of the finger movements stored;

the controller controls onscreen display by the front-facing display unit based on the degree of coincidence.

(Mode 17)

A method for controlling a display on a first screen and a display on a second screen which may be superposed on the first screen, comprising the steps of:

detecting actuations on a touch panel arranged on the first screen or the second screen that happens to be back-facing; and controlling the display on one of the first screen and the second screen that happens to be front-facing based on information regarding the actuations detected by the detection step.

(Mode 18)

A program for performing display control on a first screen and a second screen which may be superposed on the first screen; the program causing a computer to perform:

a processing of detecting actuations on a touch panel arranged on one of the first screen and the second screen that happens to be back-facing; and a processing of controlling the display on one of the first screen and the second screen that happens to be front-facing, based on information regarding actuations as detected by the user.

SYMBOLS 1, 101, 102, 103, 104, 105, 201 information terminals
11 first housing
12 second housing
13, 23 home keys
14, 24 back keys
15, 25 menu keys
30, 80 first touch panels
31, 81 first display units
40, 90 second touch panels
41, 91 second display units
51 detection unit
52 controller
53 memory
54 key inputting unit
55 opening/closure sensor
61, 62 actuation keys
63 handedness registration unit
64a specified area for right-handed user
64b specified area for left handed user
65 database
66 coincidence decision subunit
67 acceleration sensor
71 first camera
72 second camera
73 hinge
C1 information regarding the actuations

What is claimed is:

1. An information terminal, comprising:
    a first housing and a second housing interconnected for opening/closure;
    a first display unit and a first touch panel stacked one upon the other on the first housing;
    a second display unit and a second touch panel stacked one upon the other on the second housing;
    a detection unit which, in a closed state with the first and second display units being superposed one upon the other and facing outwards, detects actuations on one of the first touch panel and the second touch panel that happens to be back-facing as seen from a user;
    a controller that controls an onscreen display on one of the first display unit and the second display unit that happens to be front-facing as seen from the user, based on information regarding the actuations detected by the detection unit, and
    a registration unit that registers handedness information of user, wherein,
    the controller controls onscreen display of the display unit that happens to be front-facing based on information regarding the actuations detected from a specified area of the touch panel which happens to be back-facing;
    the controller does not use the information regarding the actuations detected in an area other than the specified area in controlling onscreen display;
    the controller changes a position of the specified area in accordance with the registered handedness information.

2. The information terminal according to claim 1, further comprising:
    an opening/closure sensor that detects an opened/closed state of the first and second housings; wherein,
    in case the opening/closure sensor has detected the closed state, the controller controls the onscreen display on the display unit that happens to be front-facing based on the information regarding the actuations.

3. The information terminal according to claim 2, wherein,
    in case the opening/ closure sensor has detected the closed state, the controller turns off a power supply of the display unit that happens to be back-facing.

4. The information terminal according to claim 1, wherein,
    each of the first and second housings includes an actuation key; and wherein,
    the controller determines the first or second housing, inputting to which by the actuation key has been detected in the closed state, as being the front-facing housing.

5. The information terminal according to claim 1, further comprising:
    an acceleration sensor; wherein,
    the controller, in the closed state, determines a front-facing side based on detection by the acceleration sensor.

6. The information terminal according to claim 1, wherein,
    the controller performs first screen control when the detection unit has detected a finger slide movement on the touch panel which happens to be back-facing.

7. The information terminal according to claim 1, wherein,
    the controller performs second screen control when the detection unit has detected a finger slide movement on the touch panel which happens to be back-facing as well as an inputting on the touch panel which happens to be front-facing.

8. A method for controlling a display on a first screen and a display on a second screen which may be superposed on the first screen, comprising:
- detecting actuations on a touch panel arranged on one of the first screen and the second screen that happens to be back-facing as seen from a user;
- controlling the display on one of the first screen and the second screen that happens to be front-facing as seen from the user based on information regarding the actuations detected by the detection process, and
- registering handedness information of user, wherein,
- controlling the display comprises controlling onscreen display of the display unit that happens to be front-facing based on information regarding the actuations detected from a specified area of the touch panel which happens to be back-facing;
- controlling the display comprises not using the information regarding the actuations detected in an area other than the specified area in controlling onscreen display;
- controlling the display comprises changing a position of the specified area in accordance with the registered handedness information.

9. A non-transitory computer-readable recording medium storing a program for performing display control on a first screen and a second screen which may be superposed on the first screen; the program causing a computer to perform:
- a processing of detecting actuations on a touch panel arranged on one of the first screen and the second screen that happens to be back-facing as seen from a user;
- a processing of controlling the display on one of the first screen and the second screen that happens to be front-facing as seen from a user, based on information regarding actuations as detected by the processing of detection, and
- a processing of registering handedness information of user, wherein,
- the processing of controlling controls onscreen display of the display unit that happens to be front-facing based on information regarding the actuations detected from a specified area of the touch panel which happens to be back-facing;
- the processing of controlling does not use the information regarding the actuations detected in an area other than the specified area in controlling onscreen display;
- the processing of controlling changes a position of the specified area in accordance with the registered handedness information.

* * * * *